Nov. 13, 1923.
W. T. MIXSELL
FLEXIBLE VALVE DIAPHRAGM
Filed July 26, 1922
1,473,998
2 Sheets-Sheet 1
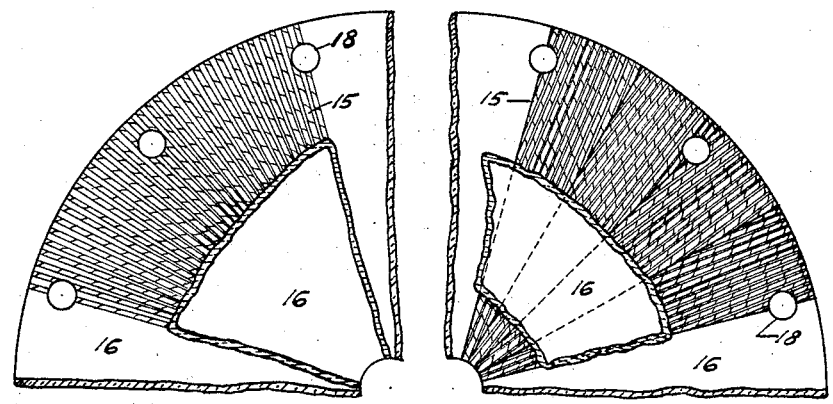
FIG. 1   FIG. 2
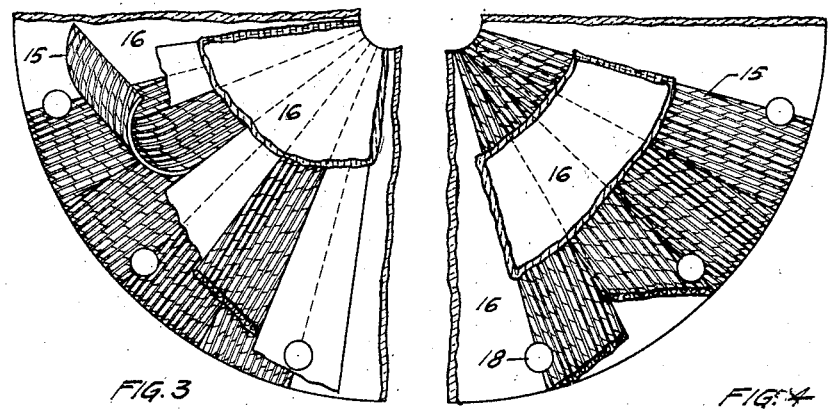
FIG. 3   FIG. 4
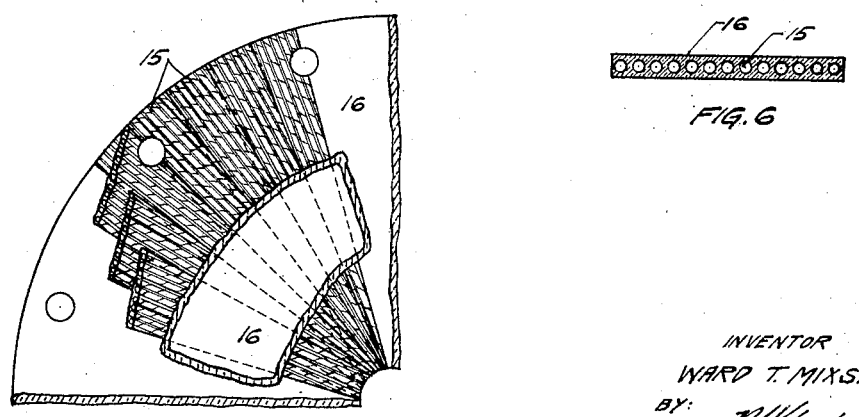
FIG. 5
FIG. 6
INVENTOR
WARD T. MIXSELL
BY:
ATTORNEY

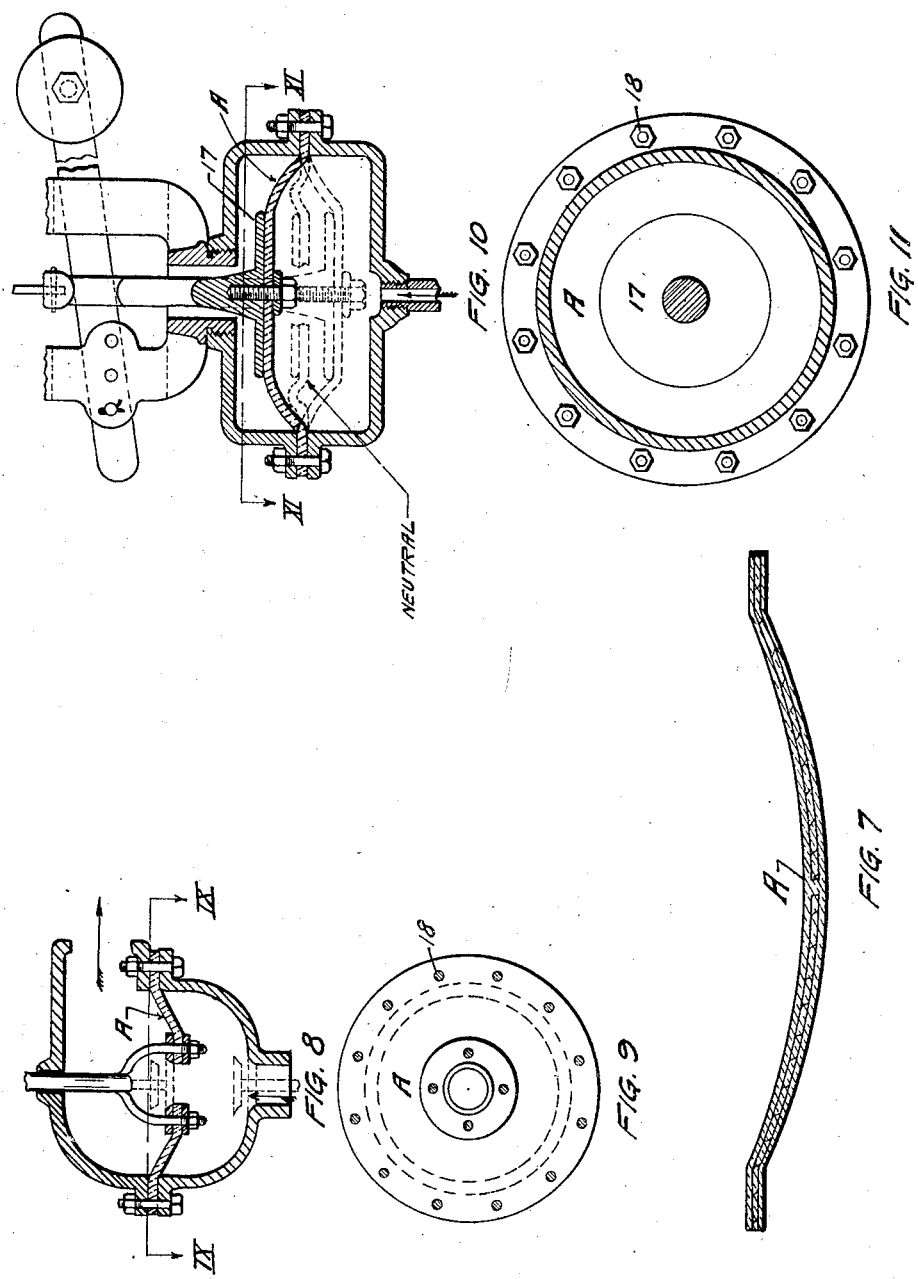

Patented Nov. 13, 1923.

1,473,998

UNITED STATES PATENT OFFICE.

WARD T. MIXSELL, OF CUMBERLAND, MARYLAND.

FLEXIBLE VALVE DIAPHRAGM.

Application filed July 26, 1922. Serial No. 577,671.

*To all whom it may concern:*

Be it known that I, WARD T. MIXSELL, a citizen of the United States, residing at Cumberland, in the county of Allegany and State of Maryland, have invented certain new and useful Improvements in a Flexible Valve Diaphragm, of which the following is a specification.

My invention relates to the art of fabricating articles made of a composite structure of fabric, or the like, preferably molded in intimate union with an elastic medium such as vulcanizable rubber compounds, or the like.

My invention will be best comprehended and properly related to the art to which it belongs if specifically described as a flexible molded diaphragm, made in a new and novel manner; all as more fully set forth hereafter.

Flexible diaphragms have a wide range of usefulness; among the more common of which may be cited:—employment as a substitute for the usual tight-fitting piston within a cylinder utilized as a liquid pumping device; and in conjunction with equalizer or compensating valves, wherein the diaphragm transmits a fluid pressure against a suitably counterbalanced free-moving piston head for the purpose of actuating appropriate dependent mechanism for accomplishing a regulatory function. There are, of course, other and varied uses to which this basic type of diaphragm is put under existing engineering practices; also there are likely to be many new uses resorted to under the terms of the additional efficiency imparted to this type of diaphragm by my present disclosure. I, therefore, do not attempt to prescribe any limitations of utility for my device, but merely select some well known uses of prior types of diaphragms by way of illustration and as affording a basis for comparing the efficiency and novelty of my invention with those other types heretofore used and known in the prior patented art.

Selecting, by way of illustration, the usual compensator or equalizer valve diaphragm in its conventional environment, it is apparent that the article must possess a high degree of flexibility without fatigue; for the diaphragm is seldom at rest, being in almost constant pulsation as the pressure on either side fluctuates. In addition to flexibility, maximum strength consistent thereto is required, as in many instances it is advisable to fit reducing controls on high pressure lines wherein direct pressures in excess of two hundred pounds per square inch are encountered.

In the past it has been the universal practice to construct diaphragms of rubber or rubber compounds without fabric or cordage reinforcement, whereby they attain the desired degree of flexibility, but only at the expense of being too weak for any than low pressure work; or, to build them up of plies of conventional cross-woven fabric or cross-laid cordage, usually impregnated with a vulcanizable rubber solution, with or without interposed sheets of rubber—the assembled structure being thereafter subjected to the well known molding operation.

The cross-woven insert fabric diaphragms possess inherent weakness due to inequality of stress in the component strands, accounted for by the fact that those relatively few strands that cross the center of the disk structure with extremities effectively anchored on the bolted periphery, have their entire lengths free to flex when the diaphragm distorts under pressure, whereas, the shorter strands, farther removed from the center, are necessarily restricted in their amplitude of flexation in proportion to their effective lengths. The practical consequence of this inherent defect is that the work is necessarily done by a relatively few short members which break down prematurely thereby rupturing the diaphragm before the longer elements have exerted their influence.

Recognition of this inherent tendency of cross-woven insertions to break down prematurely has led to the universal practice of incorporating into the structure a sufficient number of plies to meet the stresses encountered. This excessive thickening of the structure carries with it undue stiffness, whereby the diaphragm is wholly unable to accommodate the desired response to slight pressure variations, to the detriment of the proper functioning of the device of which it forms the controlling element.

It has also been demonstrated that any flexation of a disk diaphragm composed of cross-woven insertions is attended by a "creeping" of the component strands within the structure, due to the previously explained inequality of stresses in the strand elements. This relative "creeping" not only induces separation between the strands and the rubber coating, but the frictional movement of strand across strand works a weakness which soon destroys the effectiveness of the structure.

Being cognizant of the inherent defects in existing diaphragms, and of the limitations these deficient structures impose upon the proper functioning of the device with which they are associated; I have produced a new and novel method of fabrication whereby the stress-resisting material is utilized to the best mechanical advantage to attain a great resistance to rupture under distorting pressure with maximum flexibility—at the same time insuring an added economy in manufacture, due to the relatively small amount of costly material utilized and the simplicity of the manufacturing operations.

These and other beneficial objects are attained in the specific structure by utilizing so called "cord fabric"—a structure having its strength strands arranged parallel, with or without an occasional weft thread as a binder—or by building radially directed "cords" independently into the structure. In either event, the strength elements are disposed radially of the diaphragm, or substantially so, in order that the usual stresses encountered by such structures shall be equally distributed throughout the strength members and whereby the destructive "creeping" of strand on strand is eliminated.

The several figures of the accompanying drawings are casual illustrations of the assembly of my diaphragm in several conventional appliances, and further suggest several alternative methods of fabricating the diaphragm—purely as manufacturing innovations—but are not to be construed as limitations within which the invention must or should be confined.

Figure 1 illustrates a fragmental view of a diaphragm wherein all cords extend radially and intact from periphery to center; the vulcanizable binder being broken away in part.

Figure 2 as also the remaining figures, illustrate methods of fabrication whereby commercial cord fabric may be utilized— cord fabric in the sense employed, denotes a commercial weave extensively used in the tire making art, and characterized by parallel strength members held in this relation by light weft threads spaced relatively far apart. Specifically, Fig. 2 may be conveniently termed the "segmental, single ply abutting section method"—the segments being cut to the desired angular size by a suitable die working upon an extensive sheet of the cord fabric. The sheet of uncut stock usually being impregnated or frictioned with an adhesive vulcanizable rubber solution. In all figures the diaphragm is shown in fragmental view to better illustrate the several methods of fabrication.

Fig. 3 may be termed the "segmental, multiple ply abutting section method"—wherein the abutting edges of the respective plies are staggered to eliminate lines of weakness.

Fig. 4 may be termed the "segmental, single ply edge-lapped method"—wherein the edges of the segments are overlapped, shingle-fashion, to attain greater radial strength than the simple method disclosed in Fig. 2.

Fig. 5 may be termed the "segmental, multiple ply edge-lapped method"—wherein two or more overlapped strands are attained from periphery to center; in other words, double ply.

Fig. 6 is a fragmental cross section illustrating the conventional relation of a single ply cord structure with its vulcanized binder.

Fig. 7 is a cross section through a molded diaphragm, showing a preferred "dished" form for its initial condition.

Fig. 8 is a cross section through a conventional pumping device, wherein the diaphragm may be employed.

Fig. 9 is a horizontal section through IX—IX of Fig. 8.

Fig. 10 is a cross section through a conventional pressure equalizer or regulating valve, showing the adaptability of my particular improvements to the requirements of this device.

Fig. 11 is a horizontal section through XI—XI of Fig. 10.

Throughout the several figures of the drawing similar numerals of reference denote corresponding parts. Letter "A", in general, indicates the diaphragm; 15, the "cords" or "cord stock" in whatever form it is used; 16, the binding or unifying medium in which the "cord" is usually imbedded; 17, a customary balanced piston head upon which the deflected diaphragm reacts (see Fig. 10), and 18, peripheral bolt holes for securing the edges of the diaphragm between suitable flange members.

In consideration of the fact that the advantages and specific points of novelty disclosed in this invention are obvious to those skilled in the art to which it pertains, only a brief discussion of the variations shown in the drawings is appended.

With regard to the simple construction of Fig. 1, it is apparent that the theoretical desideratum is here disclosed to best advantage. From a practical point of view this method has the disadvantage of excessive central thickness at the vertex of the radial cords and, where the central portion is perforated to admit a piston guide stem or the like, the cords are cut and their continuity from periphery to periphery interrupted, thus this method of construction is not justifiable in view of the equally effective and less expensive methods disclosed hereafter. If it be desired to adhere to this method of intact cords from periphery to center and yet avoid overlapping at the center, it is obvious that individual radial cords could be assembled in flat abutting relation at the center and thence radiate to the periphery in uniformly divergent relation. Between the diverging cords additional cords, stopping short of the center, could be placed and the whole lightly spun together in an appropriate manner; the whole suitably overlaid with a vulcanizable binder and molded in the usual manner.

In view of the expense involved in practicing the method of Fig. 1, and further considering the fact that the cord stock therein used could only be coated or frictioned at considerable expense and inconvenience, preference is expressed for the construction disclosed in Fig. 2. This practice permits the utilization of commercially prepared and previously frictioned cord fabric, cut into appropriate segments and assembled between layers of vulcanizable rubber in single ply in abutting relation, and thereafter molded and vulcanized in the usual manner. In this type, during the molding, there is a tendency of the segments to open up along their abutting edges when the overlaying rubber sheets are "in flow" under heat and pressure; thereby creating a certain element of weakness, to overcome which the construction disclosed in Fig. 3 is preferred.

The construction of Fig. 3 completely eliminates the weakness due to the spreading of the single ply segments. In this method a plurality of plies, each of abutting segmental form, are overlaid with their respective edges staggered; thus resulting in the ultimate strength of the diaphragm being increased in proportion to the number of plies, and making a structure that molds up into an efficient flat product.

The segmental, single ply, edge lapped structure of Fig. 4, illustrates the attainment of a high degree of radial strength attained by extending a greater number of intact cords from center to periphery than obtains in the method of Fig. 2, and with the use of but a small additional amount of cord stock. This method eliminates the necessity and expense of the two-ply system disclosed in Fig. 3, and the weakness developed by the existence of interstices between abutting segments as cited in discussing Fig. 2. In laying up this method, the apex of the several segments are made relatively broad in order that virtually a double ply is attained at the center, while at the periphery the adjacent segments present but a single ply due to the termination of the overlap of the edges. Each successively laid segment overlaps a portion of its neighbor, as shown in Fig. 4, whereby the short parallel cords of each separate segment, terminating progressively short of the center, overlay and reinforce each other in a manner tending to resist lateral separation under molding pressure and unify the structure to resist radial stresses. The overlapping blunt ends of the apex of each segment contain a number of full length cords presenting, in the aggregate, a most effective distribution of strength elements. Such a diaphragm is particularly flexible and radially strong.

In Fig. 5 is shown a variation of the basic system disclosed in Fig. 4, but so overlapped that at least a double ply of cords will be attained at the periphery, and the multiple overlapping of the apex ends will insure that the proportionate strength will be maintained throughout. This diaphragm will withstand extreme pressures, and yet be much more flexible at the point of greatest flexation than a correspondingly strong diaphragm made of conventional cross-woven fabric.

It will be appreciated that these flexible diaphragms are subjected to unusually severe conditions and that they are concealed parts, working constantly under conditions that do not admit of periodic inspection for the purpose of ascertaining their nearness to failure. Their failure, in the average installation, is a costly and inconvenient occurrence. It will thus be appreciated that any improvement, however slight, becomes of great significance to the large engineering field within which they find a place.

By reference to Figs. 10 and 11, it is noted that the zone of greatest fatigue occurs in the circular area at or about the periphery of the floating piston head 17. About this line of resistance all diaphragms of the cross woven fabric type develop a well defined circular buckle at an early stage of their service; the time and seriousness of this deformation, of course, depending upon the character of the service and the pressures encountered. The constant working about this point soon breaks down the conventional diaphragm, whereas in the present invention exhaustive tests have proved that the lines of strength cords, being radial and therefore normally at right angles to the fatigue zone about the piston, resist the buckling action most successfully and practically eliminate the otherwise fatal weakness at this point. The dotted lines in Fig. 10 indicate the depressed piston when the pressure on the primary source has dropped until the counterbalance has deflected the piston; and in this condition the tendency of the diaphragm to crease or buckle about the piston edge on the up-stroke is best appreciated.

The radial strength elements could be made of any material that is relatively inextensible, for instance, woven wire, instead of conventional cordage; provided, such material be capable of considerable flexation without fatigue. The neutral position of the diaphragm shown in Fig. X, illustrates the peculiar circumferential wave that forms about the periphery of the piston-restrained diaphragm at each pulsation. At this point fatigue tendency is high, and it is here that cross-woven fabric of the prior art shows fatal weakness. By the radially directed method of fabricating the strength elements this fatigue point is eliminated as a source of trouble, for the obvious reason that each radial member is free to adjust itself circumferentially with respect to adjacent members by a slight resilient separation at the expense of stretching the elastic binder, thus compensating for the relative circumferential adjustments between the elements within the zone of disturbance, without rupture. The conventional cord fabric, impregnated with a rubber solution prior to cutting and fabrication into the diaphragm, is peculiarly adapted to negative this buckling fatigue, for each cord is practically insulated by a film of resilient compound whereby separation of cord-from-cord in circumferential adjustment is made possible.

Test observation of cross-woven fabric diaphragms in competition with my radial cord structure, where the same weight of fabric insertion strength elements are employed, has conclusively demonstrated the vast superiority of the latter, not only as measured by length of service, but of greater moment, by the ultimate breaking stress registered. In test the cross-woven type almost invariably fails prematurely along the piston periphery zone, showing the parting of the transverse elements in advance of the failure of the few radially directed strands. On the other hand, the radial cord type shows transverse rupture at almost any radial point between the center and the bolted periphery, showing that the strength elements are uniformly stressed and that no unnecessary material is incorporated into the article.

Having now described my invention what I claim is:

1. A flexible diaphragm of the class described, comprising a circular disk fabricated of radially directed strength members embedded in a unifying binder.

2. A flexible diaphragm of the class described, comprising a circular disk fabricated of radially directed strength members embedded in a unifying, elastic vulcanized binder.

3. A flexible diaphragm of the class described, comprising a circular disk fabricated of radially directed strength members embedded in a unifying elastic binder, said members having been previously treated with a rubber solution whereby they are practically insulated from each other.

4. A flexible diaphragm of the class described, comprising a relatively thin, flat body fabricated of strength members directed toward a common center and embedded in an elastic binding medium of vulcanized material.

5. A flexible diaphragm of the class described, comprising a disk-like body fabricated of textile cord-like strength elements, radially directed and embedded in an elastic binding medium.

6. A pressure-resisting flexible diaphragm of the class described, comprising substantially radially directed strength elements embedded between layers of an elastic vulcanized binding medium.

7. A pressure-resisting flexible diaphragm of the class described, comprising radially directed strength elements bonded in an elastic vulcanized medium whereby greater extensibility circumferentially than radially is attained.

8. A pressure-resisting flexible diaphragm of the class described, comprising strength members of cord laid in substantially radial relation in a vulcanized binder having greater resilient properties than said cord members.

9. A pressure-resisting diaphragm of the class described, comprising a plurality of segmental sections of parallel strength members running in the direction of the length of the said sections, said sections being assembled in the form of a circular disk whereby the said strength members are substantially radial, and embedded in an elastic vulcanized binder whereby the assembled article is unified by a molding operation.

10. A pressure-resisting flexible diaphragm, comprising a plurality of relatively narrow segmental sections composed of parallel strength members, said sections being assembled and molded in union between sheets of an elastic vulcanized medium with the strength members in substantial radial relation.

11. A pressure-resisting flexible diaphragm, comprising a plurality of relatively narrow segmental sections composed of parallel strength members, said sections being assembled in superposed radial relation whereby a plurality of intact strength members extend substantially radially from the center of the diaphragm to its periphery and molded in union with an elastic vulcanized binder.

12. A pressure-resisting flexible diaphragm, comprising a plurality of relatively narrow segmental sections composed of parallel strength members, said sections being overlappingly assembled in approximately radial relation with the overlap progressively increased toward the center whereby numerous intact strength members are maintained from center to periphery.

13. The combination with a regulatory device comprising a fixed body and a moving balanced part, of a flexible diaphragm comprising a vulcanized disk composed of radially directed strength members carried in a vulcanized binder, said diaphragm being suitably anchored to the fixed body and the moving part whereby the moving part is actuated by fluctuating pressures on either side of said diaphragm.

14. The method of fabricating a flexible circular diaphragm, consisting of the following steps: *a*, impregnating cord fabric with a vulcanizable rubber solution; *b*, cutting the impregnated fabric into segmental sections and laying them in intimate relation in radial relation in this form of a circular disk; *c*, overlaying the assembled segmental sections with sheets of a vulcanizable elastic material; *d*, unifying the assembled diaphragm by a molding operation in the presence of heat and pressure.

WARD T. MIXSELL.